July 22, 1969
F. M. BAILEY
3,457,495
ERROR CIRCUIT WITH MEANS FOR REDUCING EXCITATION CURRENTS
FOR ROTATING TRANSFORMER INPUT
Filed March 9, 1967
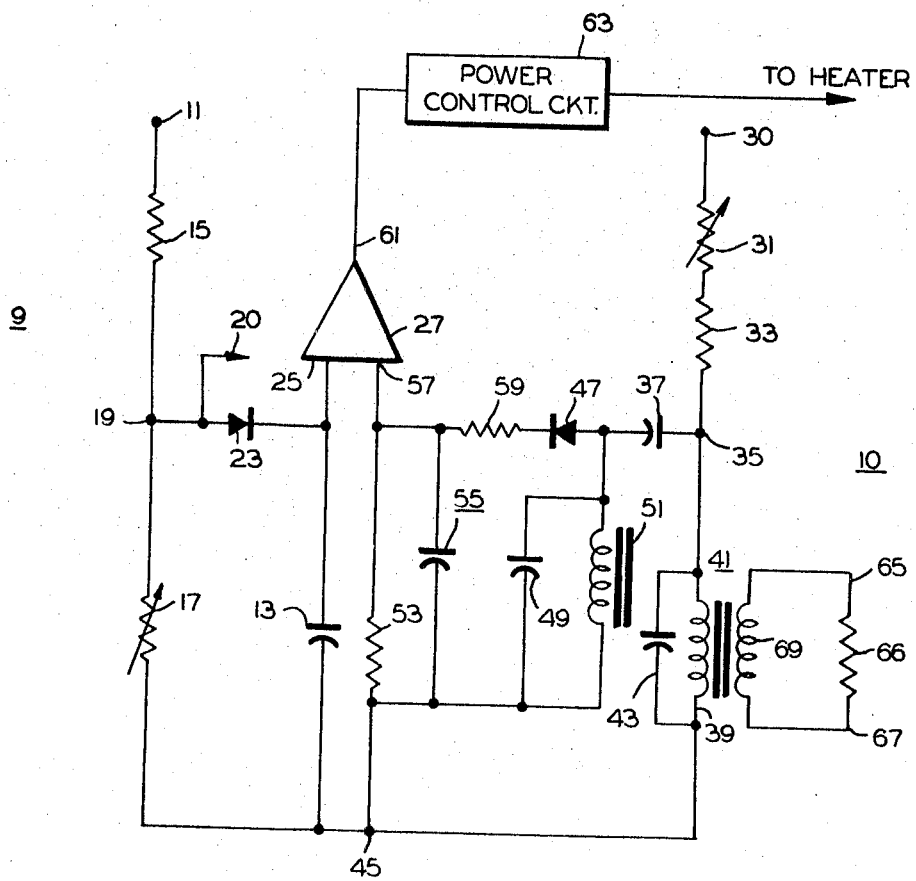
INVENTOR.
FRANCIS M. BAILEY
BY United States Patent Office 3,457,495
Patented July 22, 1969

3,457,495
ERROR CIRCUIT WITH MEANS FOR REDUCING EXCITATION CURRENTS FOR ROTATING TRANSFORMER INPUT
Francis M. Bailey, Roanoke, Va., assignor to General Electric Company, a corporation of New York
Filed Mar. 9, 1967, Ser. No. 621,975
Int. Cl. H02p 13/08, 13/10
U.S. Cl. 323—53   2 Claims

ABSTRACT OF THE DISCLOSURE

An error amplifier circuit having (1) a reference input signal derived from a voltage divider connected across a reference voltage source and (2) a feedback input derived from a feedback portion including one winding of a transformer, a second rotatable winding of which is connected in series with a thermistor located in proximity to an electric heating element which is to be controlled by the circuit. Changes in the magnitude of the thermistor result in changes in the magnitude of the impedance of the transformer winding in the feedback portion. A capacitor connected in parallel with the transformer winding reduces excitation current by producing a resonant condition thereby making it unnecessary to provide an extremely small air gap between windings.

Background of the invention

The present invention relates to an electric circuit for reducing excitation currents for rotating transformers.

In certain industrial applications, feedback signals are derived by positioning a thermistor or other condition sensitive element in proximity to an electric element, the condition of which is to be controlled. The thermistor is connected across one winding of a rotating transformer, the other winding of which is connected into a feedback circuit. Changes in the magnitude of the thermistor are reflected through the first winding to the second. The second winding of the transformer is subjected to an excitation voltage to produce a feedback signal which may be compared to a reference signal by an error amplifier. Due to the inherent characteristics of the transformer winding, it has been thought that the excitation current must be relatively large in order to produce an adequate feedback signal unless the air gap between the first and second windings is made extremely small through the use of costly precision machining.

Summary of the Invention

The present invention is an error circuit which produces an error signal for controlling the power delivered to an electric element. The error circuit includes an error amplifier with a reference signal circuit and a feedback signal circuit. The feedback signal is produced through a transformer having a first winding connected in the feedback signal circuit and a second rotatable winding connected in series with a variable impedance element. The variable impedance element is proximate to the electric element and is responsive to the condition of the electric element. A reactance means is connected in parallel with the first winding of the transformer for reducing the excitation currents for the transformer.

Brief description of the drawing

The drawing shows schematic diagram of a control circuit for an electric heating device using a rotating transformer.

Description of the preferred embodiment

Referring now to the drawing a temperature control bridge consists of a reference portion 9 having a fixed resistor 15 and a potentiometer 17 forming a voltage divider with point 19 as an output point connected to the anode of diode 23. Input points 11 and 45 for reference portion 9 are connected across an AC or DC voltage power supply (not shown). The cathode of diode 23 is connected to an input terminal 25 of an amplifier 27 and to a filter capacitor 13. In addition to the reference portion 9, the temperature control bridge has a feedback portion 10 having terminals 30 and 45 connected across a 2 to 5 kc. AC voltage power supply (not shown). If an AC voltage is used on the reference portion 9, one power supply can be used for both the reference portion 9 and the feedback portion 10. The feedback portion 10 is a voltage divider having two resistive legs joined together at point 35, which is at one terminal of a capacitor 37. The leg including terminal 30 contains a potentiometer 31 and a fixed resistor 33, whereas the other leg of feedback portion 10 contains the stationary winding 39 of a rotating transformer 41 connected in parallel with a reactance, such as capacitor 43. The terminal 45 is connected to one input terminal 57 of amplifier 27 through the parallel combination of a resistor 53 and a capacitor 55. The upper end of a capacitor 55 is connected through a resistor 59 to the cathode of a diode 47, having its anode connected to one terminal of capacitor 37. A capacitor 49 with its upper terminal connected to the junction of diode 47 and capacitor 37 is also connected in parallel with a choke 51 having its lower end at the terminal 45. The output 61 of amplifier 27 leads to a power control circuit 63 which supplies power to a heating element, which is not shown. A thermistor 66 is connected across terminals 65 and 67 of the rotary winding 69 of rotating transformer 41.

With a voltage applied to the reference portion 9 of the temperature control bridge circuit at terminals 11 and 45, resistors 15 and 17 act as a voltage divider whereby point 19 is placed at a certain potential relative to terminal 45. The level of this potential, adjustable through potentiometer 17, is applied to input terminal 25 of amplifier 27 through diode 23. Point 19 connects to an output terminal 20 in event the reference portion 9 is used with more than one feedback circuit.

The 2–5 kc. AC voltage applied across potentiometer 31 and the stationary winding 39 of rotating transformer 41 creates a potential at point 35. The rotary winding 69 of transformer 41, being connected across the thermistor 66, causes a change in the impedance of the stationary winding 39 of transformer 41 for every change in temperature. The change in the impedance of stationary winding 39 changes the level of potential at point 35 which, in turn, changes the value of the signal applied to input terminal 57 of amplifier 27. To reduce the magnitude of current required to excite the transformer 41, the magnitude of capacitor 43 is selected so that the capacitor produces a capacitive reactance that cancels out the inductive reactance of the windings of the transformer 41. This "tuning" out of the reactance assures that the resistive changes in the magnitude of the thermistor 66 will have a maximum influence on changes in the signal at point 35 with minimum excitation currents without requiring a reduction in the inter-winding air gap. An input filter circuit consisting of capacitors 37 and 49 and choke 51 reduces the pickup of stray low frequency currents which may occur should the rotating transformer 41 be located within a heating element (not shown).

While diode 47 is necessary to rectify the AC signal derived from the feedback portion 10, diode 23, which is also used for rectifying a signal from the reference portion 9 of the circuit when an oscillator voltage is applied thereto, is intended to provide temperature compensation when the reference portion 9 is powered by a DC voltage supply, thereby keeping both the reference portion 9 and the feedback portion 10 balanced during ambient temperature changes of the system. Potentiometer 17 in the reference portion 9 of the bridge circuit provides adjustment of temperature when one or more feedback portions 10 are connected together thereby providing a common temperature control for several temperature control circuits. Potentiometer 31 then provides a trimming adjustment of the individual heater controls for balancing the various heaters in the overall system to a uniform level of temperature.

What I claim is:
1. An electric circuit for producing an error signal to control the power delivered to an electric element, said circuit including:
 (a) an error amplifier;
 (b) a reference portion for producing a reference signal to be applied to one input of said error amplifier;
 (c) a feedback portion for producing a feedback signal to be applied to a second input of said error amplifier, said feedback portion including
  (1) a transformer having a first winding connected serially in said feedback portion and a second rotatable winding,
  (2) a variable impedance element connected serially with said second winding and in proximity to the electric element, the magnitude of said impedance element being related to the condition of the electric element, and
  (3) reactance means connected in parallel with said first winding of said transformer for reducing required excitation currents for said transformer without reducing the air gap between the first and second windings of said transformer.

2. An electric circuit as recited in claim 1 wherein said reactance means comprises a capacitor having a magnitude which gives rise to a resonant condition under normal circuit operating conditions.

References Cited

UNITED STATES PATENTS

| | | | |
|---|---|---|---|
| 2,857,562 | 10/1958 | Umrath | 318—20.610 |
| 3,044,009 | 7/1962 | Lang et al. | 323—53 |
| 3,083,326 | 3/1963 | Deming et al. | 318—138 |
| 3,324,368 | 6/1967 | Von Delden | 318—138 |

JOHN F. COUCH, Primary Examiner

G. GOLDBERG, Assistant Examiner

U.S. Cl. X.R.
219—494, 497